Jan. 14, 1969 S. B. GRAY 3,422,306

DISTORTION CORRECTION CIRCUITRY

Filed May 21, 1965

INVENTOR
STEPHEN B. GRAY

BY Stanley M. Schurgin

ATTORNEY 3,422,306
DISTORTION CORRECTION CIRCUITRY

Stephen B. Gray, Newton, Mass., assignor to Sylvania Electric Products Inc., a corporation of Delaware
Filed May 21, 1965, Ser. No. 457,555
U.S. Cl. 315—27 3 Claims
Int. Cl. H01j 29/76

ABSTRACT OF THE DISCLOSURE

A distortion correction circuit for eliminating distortion in a magnetically-deflected cathode ray tube. Uncorrected deflection signals are predistorted in an inverse manner to the distortion caused by the cathode ray tube to produce corrected deflected signals which, when applied to deflection amplifiers associated with the cathode ray tube, cause deflection in the cathode ray tube free of pincushion and nonlinearity distortion. More particularly, uncorrected horizontal and vertical deflection signals $V_x$ and $V_y$ are applied to respective squaring circuits, squared, and summed in a summing network to produce a summed signal $p^2=(V_x^2+V_y^2)$. The $(V_x^2+V_y^2)$ signal is applied to each of two multipliers together with respective inverted versions of the uncorrected deflection signals $V_x$ and $V_y$ whereby two signals $-V_xap^2$ and $-V_yap^2$ are produced by the multipliers. The $-V_xap^2$ and $-V_yap^2$ signals are added to the corresponding deflection signals $V_x$ and $V_y$ to produce corrected signals $V_{x1}=V_x(1-ap^2)$ and $V_{y1}=V_y(1-ap^2)$. The corrected signals $V_{x1}$ and $V_{y1}$, when applied to the corresponding deflection amplifiers, cause deflection in the cathode ray tube free of pincushion and nonlinearity distortion.

This invention relates to electronic circuitry and more particularly to circuitry for correcting pincushion distortion and sweep non-linearity in magnetically deflected cathode ray tubes.

In magnetically deflected cathode ray tubes, the electron beam, and hence the spot it produces on the tube face, is ideally displaced horizontally and vertically from the center of the tube by an amount which is proportional, respectively, to the magnitude of the horizontal and vertical deflection signals. This ideal displacement is not met in practice by reason of irregularities known as pincushion distortion and sweep non-linearity. Pincushion distortion is caused by the faceplate geometry of the tube and nonlinear deflection of the electron beam with variations in both the horizontal and vertical deflection signals. Sweep non-linearity results from the deflection being a non-linear function of its driving current. Heretofore, field correction coils have been used to reduce pincushion distortion, but these coils degrade the resolution of the cathode ray tube, and do not correct, and often worsen, non-linearity. Correctional circuitry that has been suggested is complex and inadequate for many applications requiring precision, such as in character recognition systems.

It is, therefore, an object of the present invention to provide a relatively simple and precise correction circuit for eliminating pincushion distortion and sweep nonlinearity. Another object of the invention is to provide pincushion correction circuitry employing a novel multiplier circuit.

In accordance with the present invention, the uncorrected deflection signals are predistorted in an inverse manner to the distortion caused by the cathode ray tube to produce corrected deflection signals which are related to the uncorrected inputs and which are functions of both the horizontal and vertical deflection signals. These corrected deflection signals produce deflection in the cathode ray tube free of pincushion and non-linearity distortion.

The invention will be more fully understood from the following detailed description, taken in conjunction with the accompanying drawings, in which.

It can be shown that the radial displacement of an electron beam from the center of a magnetically deflected cathode ray tube is sin $\theta=KI$, where $\theta$ is the displacement angle from the tube axis, K is a constant for a particular tube and I is the resultant of the horizontal and vertical deflection currents. It can also be shown that the radial displacement S of a spot on the tube face is $S=Q \tan \theta$, where Q is a constant for a given tube. The dissimilarity of these two expressions is the cause of pincushion distortion and non-linearity, and if this dissimilarity can, in effect, be eliminated, both non-linearity and pincushion distortion will be corrected. Applicant has discovered that the requisite correction is achieved by predistorting the deflection signals in a manner inverse to the encountered distortion. The corrected deflection signals $V_{x1}$ and $V_{y1}$ are functions of both the horizontal and vertical uncorrected deflection signals and obey the equations $$V_{x1}=V_x(1-ap^2)$$

and $V_{y1}=V_y(1-ap^2)$, where $a$ is a constant for a given tube and $p^2$ is equal to $V_x^2+V_y^2$, $V_x$ and $V_y$ being the uncorrected deflection signals. The correction equations are approximate and ignore fifth and higher order terms but are sufficiently accurate for practical purposes. The deflection coils must be supplied with deflection currents, and suitable amplifiers are provided to transform the corrected voltages to currents.

Figure 1:
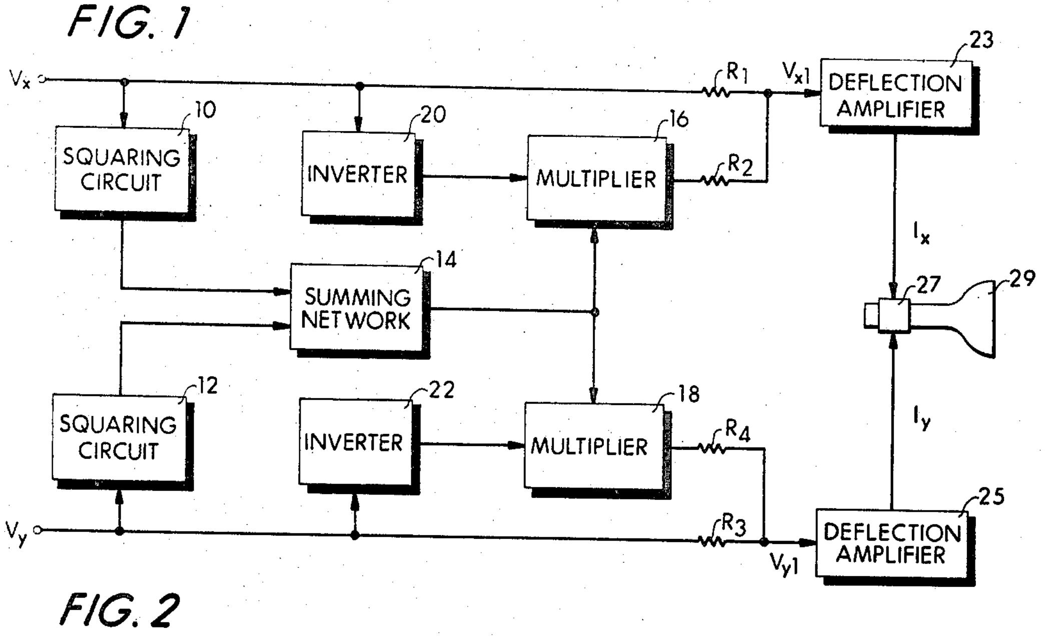
FIG. 1 is a block diagram representation of an embodiment of the invention.

The correction is implemented according to the invention by the embodiment illustrated in FIG. 1. The deflection signals to be corrected, $V_x$ and $V_y$, are applied to respective squaring circuits 10 and 12, the outputs of which are applied to a summing network 14 which produces the sum of $V_x^2$ and $V_y^2$. This summed output is then applied in parallel to one input terminal of respective multipliers 16 and 18, the second input of which is an inverted version of the respective deflection signals, produced by inverters 20 and 22. The output of each multiplier is added to the corresponding deflection signal via resistors R1 and R2, and R3 and R4 to produce the corrected deflection signals $V_{x1}$ and $V_{y1}$ which are now predistorted to produce distortion free deflection in the cathode ray tube. The corrected voltages $V_{x1}$ and $V_{y1}$ are transformed by respective deflection amplifiers 23 and 25 into currents $I_x$ and $I_y$ necessary to drive the deflection coils 27 of cathode ray tube 29.

Figures 2, 3:
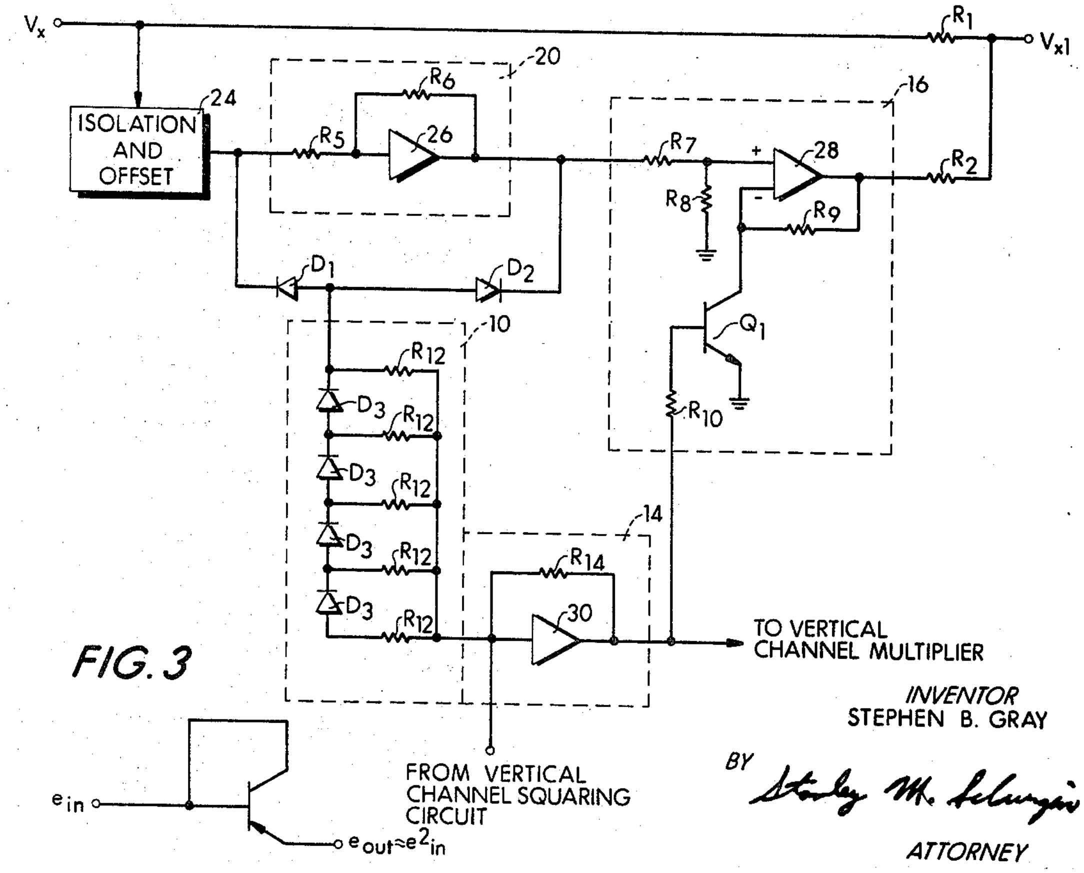
FIG. 2 is a schematic diagram of one channel of a correction circuit according to the invention.
FIG. 3 is a schematic diagram of a transistor useful in the invention.

The implementation of the block diagram of FIG. 1 is illustrated in FIG. 2. Since both horizontal and vertical correction circuits are identical, only one channel, the horizontal, will be illustrated and described. The horizontal deflection signal $V_x$ is applied to an isolation and offset circuit 24 which adjusts the operating level such that the deflection signal is zero when the electron beam is on axis, to correct for tube misalignment, and which provides isolation between the signal source and the instant circuit. The output of the isolation and offset circuit 24 is connected to inverter circuit 20 which includes an operational amplifier 26 having an input resistor R5, and a feedback resistor R6 connected between its output and input terminals. These resistors are of equal value to provide inversion with unity gain. First and second diodes D1 and D2 are connected with their anodes back to back between the output of operational amplifier 26 and the output of the isolation and offset circuit 24, and are operative to allow bipolar operation of the squaring circuit 10, since the input signals can be positive or negative. The common junction of diodes D1 and D2 is connected to a ladder network consisting of series connected diodes D3 and shunt resistors R12. The common connection of resistors R12 is connected to the input of an operational amplifier 30 having a feedback resistor R14 connecting its output and input. This operational amplifier stage comprises summing network 14.

The diode ladder network is a well known means for squaring an input signal by providing a plurality of diodes which successively conduct as the input signal increases, the output signal approximating the square of the input signal. The quadratic characteristic of diodes D3 exists in only one quadrant and diodes D1 and D2 are provided to transpose signals of the wrong polarity into the proper polarity so that they can be appropriately squared. Diode D1 or D2 will conduct depending upon which one has a negative voltage applied to its cathode. Thus, if the signal $V_x$ is positive, the inverted version thereof is applied to the cathode of diode D2 causing it to conduct. Conversely, if $V_x$ is negative, diode D1 conducts. It is evident that the common junction between the diodes is always negative, thereby presenting signals of proper polarity to the squaring circuit 10 irrespective of the polarity of the input signals. The output of the squaring circuit 10 is then applied to operational amplifier 30, the output of which is applied to the base of a transistor Q1 included in the multiplier 16 via resistor R10. The signal from the vertical channel squaring circuit is also applied to the input terminal of summing network 14, and the summed output is applied to the multiplier circuit of the vertical channel. Alternatively, the squaring function can be provided by some transistors, such as a 2N398, the collector of which is directly connected to the base, as illustrated in FIG. 3, and the characteristics of which are such to provide an output/input function which is substantially quadratic. This squaring means is not as accurate as the ladder network but is sufficient for some purposes.

The output of operational amplifier 26 is applied via a resistive divider comprising resistors R7 and R8 to the positive input of a differential operational amplifier 28, which has a feedback resistor R9 connected between its output and negative input. The negative input of amplifier 28 is also connected to the collector of transistor Q1, operated in saturation, the emitter of which is grounded. Transistor Q1 and operational amplifier 28, together with its associated circuitry, comprise multiplier 16. This multiplier configuration, which is the subject of a copending application of Stephen B. Gray S.N. 453,402, filed May 5, 1965, assigned to the same assignee as the present application, offers a simple circuit for accomplishing the intended result. The output of the multiplier is taken at the output terminal of operational amplifier 28 and is the product of the input signals applied to resistors R7 and R10. As is explained in the aforesaid copending application, the signal applied to resistor R7 can be either positive or negative; thus, two quadrant multiplication is accomplished. The output of the multiplier is added to the uncorrected deflection signal via a resistive adder including resistors R1 and R2, to produce the corrected deflection signal $V_{x1}$. The corrected vertical deflection signal is produced similarly.

In operation, the horizontal deflection signal $V_x$ to be corrected is applied via isolation and offset circuit 24 to the input of inverter circuit 20, the output of which is then applied to squaring circuit 10 to produce a quadratic version of the deflection signal. The output of summing network 14 is the sum of the vertical and horizontal deflection signals, $V_x^2+V_y^2$, which output is then applied to one input of multiplier 16. The second input to multiplier 16 is provided by the inverted version of the deflection signal $V_x$ produced by inverter 20. The output of multiplier 16 is added via resistor R2 to the uncorrected deflection signal to produce a corrected signal $V_{x1}$ which has the required form $V_x(1-ap^2)$. The vertical channel deflection signal is corrected in like manner. The corrected signals are then converted to currents suitable to energize the deflection coils of the cathode ray tube.

From the foregoing it is evident that a relatively simple and effective correction circuit has been provided for eliminating pincushion distortion and sweep non-linearity in a magnetically deflected cathode ray tube by use of non-linearly corrected deflection signals which are functions of both horizontal and vertical deflection signals and which are predistorted in a manner inverse to the expected distortion. The invention is not to be limited by what has been particularly shown and described as many implementations will occur to those versed in the art, but is to be defined only as indicated in the appended claims.

What is claimed is:

1. A distortion correcting circuit for a magnetically deflected cathode ray tube comprising:
   - a source of horizontal deflection signals;
   - a source of vertical deflection signals;
   - respective inverting means for producing inverted versions of the deflection signals;
   - respective squaring means each operative in response to its corresponding deflection signal to produce a quadratic version of the deflection signal;
   - summing means for summing the quadratic signals from the squaring means;
   - respective multiplier means for multiplying the summed signal from the summing means and the respective inverted signals;
   - each of said multiplier means including a transistor connected to the summing means, and a differential operational amplifier having a first input terminal adapted to receive the inverted signal from the corresponding inverting means, a second input terminal connected to said transistor, and an output terminal adapted to provide a multiplied signal;
   - respective adding means each connected to the output terminal of the corresponding differential operational amplifier and to the corresponding source of deflection signals for adding the multiplied signal provided at the output terminal of the corresponding differential operational amplifier and the deflection signal from the corresponding source of deflection signals to produce a corrected version of the deflection signal; and
   - means for applying the corrected deflection signals to the cathode ray tube.

2. A distortion correcting circuit for a magnetically deflected cathode ray tube comprising:
   - a source of horizontal deflection signals;
   - a source of vertical deflection signals;
   - respective inverting means for producing inverted versions of the deflection signals;
   - respective squaring means each operative in response to its corresponding deflection signal to produce a quadratic version of the deflection signal;
   - each of said squaring means including a plurality of series-connected diodes, a plurality of resistors each connected between a common terminal and a terminal of one of said diodes, and diode means coupled to a corresponding source of deflection signals and operative to apply deflection signals from the corresponding source of deflection signals of only one polarity to the series-connected diodes;
   - summing means connected to the common terminal of the resistors in each of said squaring means for summing the quadratic signals from the squaring means;
   - respective multiplier means for multiplying the summed signal from the summing means and the respective inverted signals from the inverting means;
   - respective means for adding the multiplied signals from the multiplier means and the deflection signals to produce corrected versions of the horizontal and vertical deflection signals; and means for applying the corrected deflection signals to the cathode ray tube.

3. A distortion correcting circuit for a magnetically deflected cathode ray tube comprising:

a source of horizontal deflection signals;

a source of vertical deflection signals;

respective inverting means for producing inverted versions of the deflection signals;

respective squaring means each operative in response to its corresponding deflection signal to produce a quadratic version of the deflection signal;

each of said squaring means including a transistor having base, collector, and emitter electrodes, the base electrode being coupled to the corresponding source of deflection signals, and the collector electrode being directly connected to the base electrode;

summing means connected to the emitter electrode of each of the transistors included in each of the squaring means for summing the quadratic signals from the squaring means;

respective multiplier means for multiplying the summed signal from the summing means and the respective inverted signals from the inverting means;

respective means for adding the multiplied signals from the multiplier means and the deflection signals to produce corrected versions of the horizontal and vertical deflection signals; and means for applying the corrected deflection signals to the cathode ray tube.

References Cited

UNITED STATES PATENTS

| | | | |
|---|---|---|---|
| 2,831,145 | 4/1958 | Albert et al. | |
| 3,205,377 | 9/1965 | Nix. | |
| 3,308,334 | 3/1967 | Bryson | 315—27 X |
| 3,309,560 | 3/1967 | Popodi | 315—27 |

RODNEY D. BENNETT, *Primary Examiner.*

BRIAN L. RIBANDO, *Assistant Examiner.*

U.S. Cl. X.R.

315—24